(12) United States Patent
Shen et al.

(10) Patent No.: US 11,128,449 B2
(45) Date of Patent: Sep. 21, 2021

(54) CIPHER SYSTEM WITH CONTINUOUSLY REPLENISHED RESERVOIR OF PSEUDORANDOM BITS

(71) Applicant: Arm Limited, Cambridge (GB)

(72) Inventors: Asaf Shen, Irvine, CA (US); Subbayya Chowdary Yanamadala, Dallas, TX (US)

(73) Assignee: ARM LIMITED, Cambridge (GB)

( * ) Notice: Subject to any disclaimer, the term of this patent is extended or adjusted under 35 U.S.C. 154(b) by 298 days.

(21) Appl. No.: 16/409,354

(22) Filed: May 10, 2019

(65) Prior Publication Data

US 2020/0358605 A1 Nov. 12, 2020

(51) Int. Cl.
*H04L 9/06* (2006.01)
*H04L 9/08* (2006.01)
*H04L 9/32* (2006.01)

(52) U.S. Cl.
CPC .......... *H04L 9/0841* (2013.01); *H04L 9/0662* (2013.01); *H04L 9/321* (2013.01)

(58) Field of Classification Search
CPC ...... H04L 9/0841; H04L 9/0662; H04L 9/321
See application file for complete search history.

(56) References Cited

U.S. PATENT DOCUMENTS

| | | | | |
|---|---|---|---|---|
| 2009/0208014 A1* | 8/2009 | Betouin | ............... | H04L 9/0662 380/277 |
| 2010/0023749 A1* | 1/2010 | Kelly | ................. | H04L 9/0662 713/150 |
| 2019/0058579 A1* | 2/2019 | Hammon | ............... | H04L 9/083 |
| 2020/0336304 A1* | 10/2020 | Hammon | ............... | G06F 7/588 |

\* cited by examiner

*Primary Examiner* — David J Pearson
(74) *Attorney, Agent, or Firm* — Talem IP Law, LLP

(57) ABSTRACT

The described cipher system includes a bits of some randomness (BOSR) reservoir; a first multiplexer circuit that receives a BOSR key, a functional key, and a first control signal for selection between the BOSR key and the functional key; a second multiplexer circuit that receives a BOSR state, a functional state, and a second control signal for selection between the BOSR state and the functional state; a block cipher logic circuit that receives the outputs from the first and second multiplexer circuits and a functional input. The block cipher outputs bits into either the BOSR reservoir or as a functional output according to a third control signal. The cipher system includes a control logic block that outputs the first control signal, second control signal, and third control signal and controls whether a clock cycle of the block cipher logic circuit is used for a BOSR operation or a functional operation.

20 Claims, 4 Drawing Sheets

CIPHER SYSTEM WITH CONTINUOUSLY REPLENISHED RESERVOIR OF PSEUDORANDOM BITS

BACKGROUND

Random and pseudorandom bits are used across a variety of scenarios. Random and pseudorandom bits may be used to form a cryptographic key or to generate some external bits of information for other purposes, as some examples.

One standard procedure for generating random bits involves a deterministic random bit generator (DRBG). The NIST SP 800-90A standard relies on cryptographic operations such as AES or HMAC (using a true random seed for the initialization of the deterministic operation).

BRIEF SUMMARY

Cipher systems with continuously replenished reservoir of bits of some randomness (BOSR) are described herein. A cipher system refers to any system that includes cipher logic, including, but not limited to cryptographic systems. The BOSR can be used for a variety of protocols and use cases, for example, for the protection of information conveyed over buses within the system ("data in transit").

A cipher system can include a BOSR reservoir; a first multiplexer circuit coupled to receive a BOSR key at a first input, a functional key at a second input, and a first control signal for selection between the BOSR key and the functional key; a second multiplexer circuit coupled to receive a BOSR state at a first input, a functional state at a second input, and a second control signal for selection between the BOSR state and the functional state; a block cipher logic circuit coupled to receive a first output from the first multiplexer circuit, a second output from the second multiplexer circuit, and a functional input, the block cipher coupled to output a certain number of bits into the BOSR reservoir or as a functional output according to a third control signal; and a control logic block outputting the first control signal, the second control signal, and the third control signal. The control logic block can control whether a clock cycle of the block cipher logic is used for a BOSR operation or a functional operation.

The cipher system described herein can implement a method of continuously replenishing a reservoir of BOSR. The method can commence by receiving an invocation of a block cipher logic circuit. In response to the invocation of the block cipher logic circuit, inputs to the block cipher logic circuit and outputs from the block cipher logic circuit can be controlled by the control logic block to perform BOSR operations and functional operations. BOSR operations may be performed during a number of extra clock cycles inserted before the functional operations, interspersed between the functional operations, inserted after the functional operations, or a combination of the three options. During a BOSR operation, the control logic block can control a first multiplexer circuit to output a BOSR key to the block cipher logic, control a second multiplexer circuit to output a BOSR state to the block cipher logic, and control receipt by a BOSR reservoir of an output of a certain number of bits from the block cipher logic. During functional operation, the control logic block can control the first multiplexer circuit to output the functional key to the block cipher logic, control the second multiplexer circuit to output the functional state to the block cipher logic, and direct the output of a certain number of bits from the block cipher logic as the functional output.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3A shows the process flow when BOSR operations are performed before functional operations. FIG. 3B shows the process flow when BOSR operations are interspersed with functional operations. FIG. 3C shows the process flow when BOSR operations are performed after functional operations. FIG. 3D shows an example implementation of a process flow when BOSR operation is performed as a combination of the implementations in FIGS. 3A-3C.

DETAILED DESCRIPTION

Figure 1:
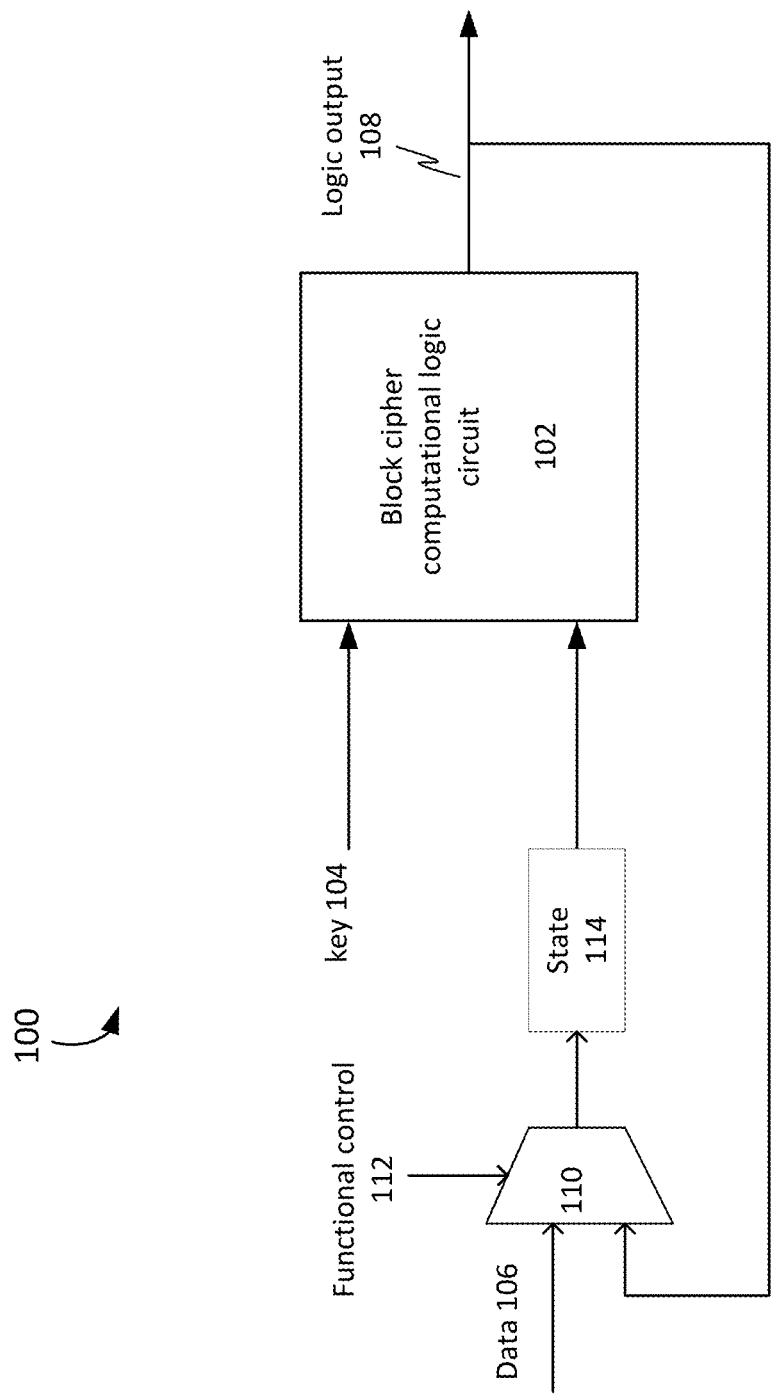
FIG. 1 shows a high level example implementation of a basic cipher system.

A method and apparatus for the creation of a continuously replenished reservoir of BOSR in a cipher system is described herein. A cipher system refers to any system that includes cipher logic, including, but not limited to cryptographic systems. The BOSR can be used for a variety of protocols and use cases, for example, for the protection of information conveyed over buses within the system ("data in transit").

Tampering, or hacking, of an electronic system, including cipher systems, can give unauthorized users access to sensitive information. An example of such sensitive information can be secret key information used in cryptography engine implementations, such as AES (Advanced Encryption Standard). An example of tampering can include access to sensitive information by reading the bus traffic on a chip. One of the techniques that unauthorized users, or adversaries, may use to obtain such sensitive information is to exploit the vulnerabilities that exist due to the implementation of system's designs in integrated circuits (ICs).

In ICs, bits of data are transported through wired (e.g., metal trace) or wireless (e.g., optical) communication links to various components within the IC. The longer the distance between components, the more time may be required to complete the transmission of the bits of data. During the transmission, a vulnerability may exist that enables an adversary to detect information conveyed over buses within the chip. Such bus transactions can be subject to bus probing, through which an adversary is looking to compromise confidential assets and/or impact the system behavior. To thwart an adversary, the data conveyed over the system buses can be scrambled using ephemeral masks so that no two bus transactions are scrambled using the same mask. This technique may require the generation of unpredictable (e.g., completely random or pseudorandom) mask bits at a non-negligible throughput. In most scenarios where bits of randomness are needed, a devoted DRBG based on, for example, the NIST SP 800-90A standard is implemented, which generally entails a full AES implementation of a cryptographic cipher. Implementing a devoted DRBG with separate cipher circuitry from the functional cipher circuitry can be costly in terms of power and area consumption.

Advantageously, the cipher system and method described herein leverage existing cipher operations of the cipher system that occur as part of the supported use case (e.g., operations on the functional bits for encryption/decryption activities). The described method does not require dedicated invocation of the block cipher operation for the sole purpose of producing BOSR. Various implementations of the described systems and methods can reduce power consumption and silicon area as compared to using separate cipher systems for functional bits and the random bits.

In the described cipher system, BOSR can be generated and used in a variety of scenarios and support different levels of security. For example, BOSR can be used to obfuscate data being transmitted across a chip. In such a use case, the BOSR are used once or at a low frequency and then discarded such that no two bus transactions are scrambled using the same BOSR values. In this scenario, BOSR are unlike long term cryptographic keys that are used repeatedly throughout the lifespan of a device. Rather, since the BOSR values are used only once (or at a low frequency), a reservoir or continuous delivery of BOSR is needed in order to implement such a scenario.

In general, the resilience of a cipher system (e.g. against a brute force attack) increases with the degree of randomness of values used to secure the results of the cipher system (e.g. cryptographic keys). However, a higher level of randomness typically means higher computing complexity and power consumption of the underlying mechanism producing that randomness. For example, a cipher system that uses completely random cryptographic keys will have a higher entropy than a cipher system that uses BOSR cryptographic keys. However, there are many applications in which the lower level of entropy is sufficient.

FIG. 1 shows a high-level example implementation of a basic cipher system. The cipher system 100 may include a block cipher computational logic circuit 102 to perform functional cipher operations. The block cipher computational logic circuit 102 can be, for example AES (Advanced Encryption Standard). The block cipher computational logic circuit 102 can receive a key 104, and a data input 106. The block cipher computational logic circuit 102 produces a logic output 108. A multiplexer 110, under the control of a functional control signal 112, outputs either the data input 106 or the logic output 108. The output of the multiplexer 110 is acted upon by a state variable 114 prior to being received by the block cipher computational logic circuit 102.

Figure 2:
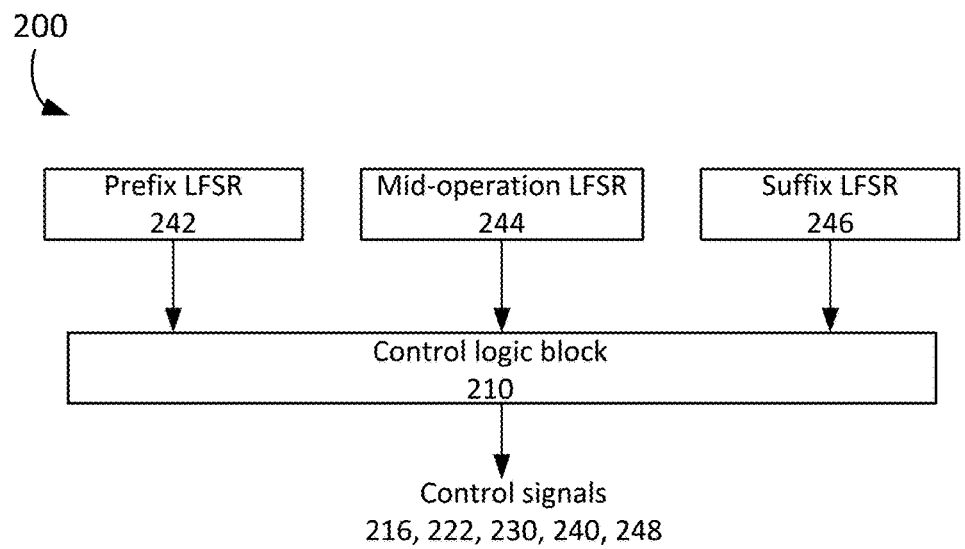
FIG. 2 shows an example implementation of a cipher system that generates and continuously replenishes BOSR.
Figure 2:
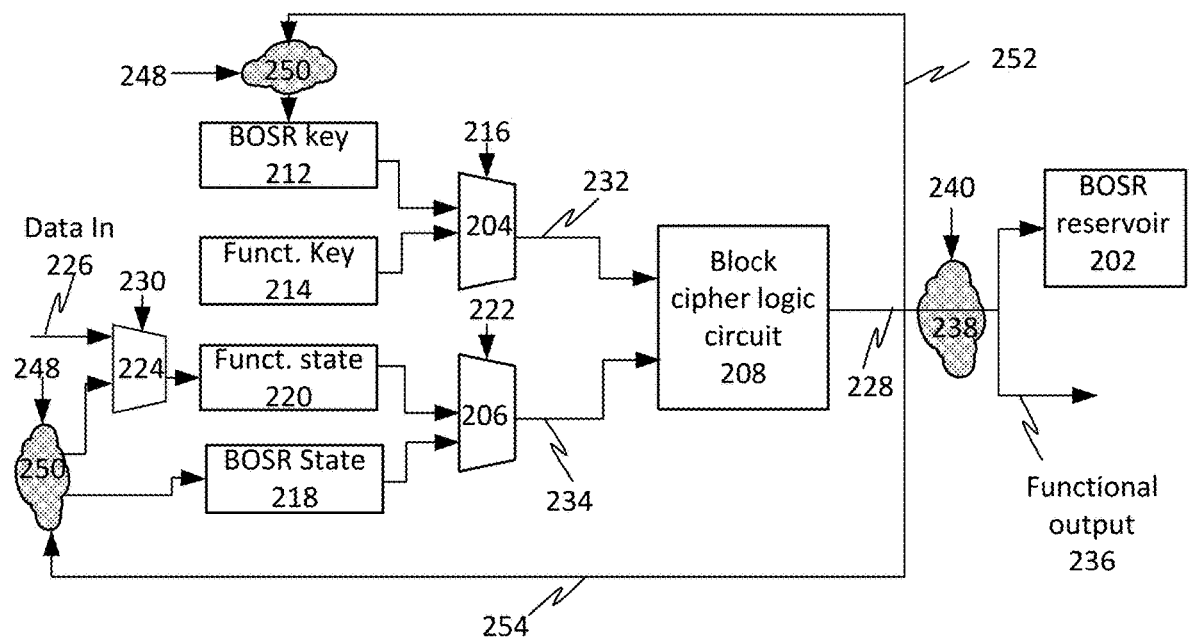

FIG. 2 shows an example implementation of a cipher system that generates and continuously replenishes BOSR. The cipher system 200 includes a BOSR reservoir 202 that stores a number of bits. The BOSR reservoir 202 can be implemented in volatile or nonvolatile memory, such as dynamic random access memory (DRAM), static random access memory (SRAM), or in a register array of latches or flip-flops. The cipher system 200 also includes a first multiplexer circuit 204, a second multiplexer circuit 206, a block cipher logic circuit 208, and a control logic block 210.

The first multiplexer circuit 204 is coupled to receive a BOSR key 212 at a first input, a functional key 214 at a second input, and a first control signal 216 for selection between the BOSR key 212 and the functional key 214. The second multiplexer circuit 206 is coupled to receive a BOSR state 218, a functional state 220, and a second control signal 222 for selection between the BOSR state 218 and the functional state 220. The functional state 220 is coupled to receive an output from a third multiplexer circuit 224. The third multiplexer circuit is coupled to receive a data input 226, a certain number of bits 228 output from the block cipher logic circuit 208, and a third control signal 230 for selection between the data input 226 and the certain number of the bits 228 output from the block cipher logic circuit 208. The data input can either be plaintext or encrypted text.

The block cipher logic circuit 208 can be existing circuitry already in use to implement a block cipher, such as an AES cipher. The block cipher logic circuit 208 is coupled to receive a first output 232 from the first multiplexer circuit 204 and a second output 234 from the second multiplexer circuit 206. The block cipher logic circuit 208 is coupled to output the certain number of bits 228 into the BOSR reservoir 202 or as a functional output 236. A selection logic 238 controlled by a fourth control signal 240 directs the certain number of bits 228 into either the BOSR reservoir 202 or as a functional output 236.

In some cases, the control logic block 210 is coupled to receive output from at least one linear feedback shift register (LFSR). The example implementation in FIG. 2 shows three LFSRs: prefix LFSR 242, mid-operation LFSR 244, and suffix LFSR 246. However, the number of LFSRs may vary depending on the cipher system requirements. The control logic block 210 outputs the first control signal 216, the second control signal 222, the third control signal 230, and the fourth control signal 240. Additionally, the control logic block 210 may also output a fifth control signal 248 to selectively reseed the BOSR key 212 using the certain number of bits 228 output from the block cipher logic circuit 208. The first control signal, second control signal, third control signal, fourth control signal, and fifth control signal can each be different signals or can be a same signal but coupled to multiple cipher system components.

The control logic block 210 controls whether a clock cycle of the block cipher logic circuit 208 is used for a BOSR operation or a functional operation. Further, the control logic block 210 generates the first control signal 216, the second control signal 222, and the fourth control signal 240 to control the number of clock cycles of the block cipher logic circuit 208 for BOSR operation. The output of the original block cipher logic circuit may be delayed to accommodate additional cycles needed for the BOSR operation. This delay can cause a latency in the cipher system. In some cases, to offset this system latency, the clock cycles of the block cipher logic circuit 208 used for BOSR operation can be adjustable. For example, the number of clock cycles can be adjusted to be less than, the same as, or greater than the number of clock cycles used during functional operation.

BOSR operation is orthogonal (e.g., unrelated) to functional operation. The BOSR data set (e.g., BOSR key, BOSR state) can be different than the functional data set (e.g., functional key, functional state). During a BOSR operation, the control logic block 210 uses the first control signal 216 to control the first multiplexer circuit 204 to output the BOSR key to the block cipher logic circuit 208, uses the second control signal 222 to control the second multiplexer circuit 206 to output the BOSR state to the block cipher logic circuit 208, and uses the fourth control signal 240 to either direct, via selection logic 238, the output of the certain number of bits 226 from the block cipher logic circuit 208 to the BOSR reservoir 202 or direct the output of the certain number of bits 228 from the block cipher logic circuit 208 to be discarded.

During functional operation, the control logic block 210 uses the first control signal 216 to control the first multiplexer circuit 204 to output the functional key to the block cipher logic circuit 208, uses the the second control signal 222 to control the second multiplexer circuit 206 to output the functional state to the block cipher logic circuit 208, and uses the fourth control signal 240 to direct the output of the certain number of bits 228 from the block cipher logic circuit 208 as the functional output 236.

Clock cycles for BOSR operation can be inserted at various times during operation of the cipher system. For example, clock cycles for BOSR operation can be inserted before invoking the functional operation of the block cipher logic circuit, interspersed with the functional operation of the block cipher logic circuit, or after functional operation use case of the block cipher logic circuit. The sequencing, or controlling, of the purpose of the clock cycles can be directed by the LFSRs (242, 244, 246). The LFSRs shift bits sequentially in a determined order across both BOSR and functional states. The LFSRs (242, 244, 246) and the control logic block 210, together, generate controls that control the first multiplexer circuit 204, second multiplexer circuit 206, third multiplexer circuit 224, selection logic 238 and logic 250.

The control logic block 210 is coupled to the BOSR reservoir 202 to receive a signal indicative of a number of bits in the BOSR reservoir. A BOSR reservoir sensor (not shown) associated with the BOSR reservoir 202 determines whether the number of BOSR bits in the BOSR reservoir 202 is below a threshold number of bits. When the BOSR reservoir sensor determines that the number of BOSR bits in the BOSR reservoir 202 is below the threshold number of bits, the BOSR reservoir sensor outputs the signal indicative of the number of BOSR bits in the reservoir to the control logic block 210. The control logic block 210 can determine the number of extra clock cycles needed for BOSR operation according to the signal indicative of the number of BOSR bits in the BOSR reservoir. Alternatively, the number of clock cycles needed for BOSR operation can be an average number of extra clock cycles over either a predetermined amount of time or a predetermined number of cycles. In some cases, the threshold number of bits can be based on the desired average rate of production of BOSR bits.

As discussed above, the block cipher logic circuit 208 receives the BOSR key 212 and BOSR state 218 during BOSR operation. The BOSR key 212 can be a pseudorandom key generated from an external source, such as an external DRBG, and can be introduced to the cipher system after a reset operation. After introduction of the BOSR key into the cipher system, the control logic block can choose for the cipher system to receive the BOSR key as a new BOSR key to replace the existing BOSR key, change or modify the BOSR key based on the outputs of the block cipher logic circuit during BOSR operation, or discard the BOSR key. Referring back to FIG. 2, the output of the block cipher logic circuit 208 can be fed back, via connection 252, into the BOSR key 212 through logic 250 to reseed or renew the BOSR key 212. The logic 250 is controlled by the fifth control signal 248 output by the control logic block 210. The BOSR produced by the block cipher logic circuit 208 for reseeding can be, for example, XORed with some or all of the bits in the BOSR reservoir 202 to refresh the bits already in the BOSR reservoir. Similarly, the output of the block cipher logic circuit 208 can be fed back, via connection 254, into the BOSR state 218 through the logic 250 to reseed or renew the BOSR state 218. The selection logic 238 and the logic 250 can include any suitable logic devices for carrying out the described functionality. In some cases, the selection logic 238 and the logic 250 may be part of the same logic circuitry.

Figure 3A:
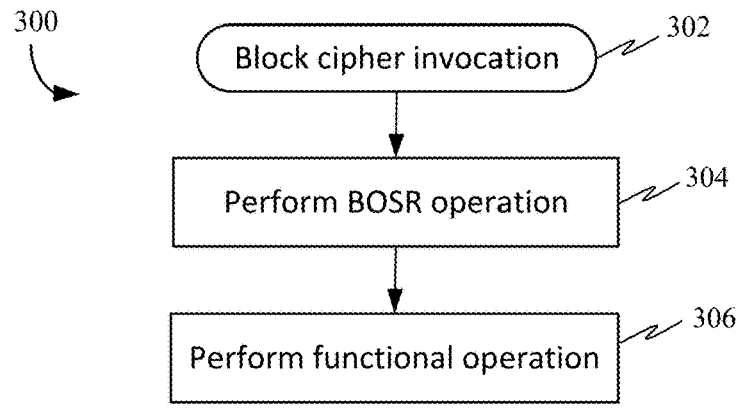
FIGS. 3A-3D show process flow for methods of continuously replenishing the BOSR reservoir.

Continuously introducing BOSR into the BOSR reservoir, whether through replacement, removal, or reseeding, can reduce the ability of an external attacker to discern what is happening within the BOSR reservoir. BOSR can be inserted into the cipher system before invoking functional operations, interspersed between functional operations, after invoking functional operations, or a combination thereof. Extra clock cycles (as compared to when the cipher system is solely used for functional operations) are applied to support adding BOSR operations. The number of extra clock cycles may vary as needed for the desired extra bits. FIGS. 3A-3D show process flow for methods of continuously replenishing the BOSR reservoir. FIG. 3A shows the process flow when BOSR operations are performed before functional operations. The method 300 begins with receiving an invocation of a block cipher logic circuit 302 to begin cipher operation. In response to the invocation, the control logic block can control the inputs to the block cipher logic circuit and the outputs from the block cipher logic circuit to perform BOSR operations and functional operations such that the cipher is used for BOSR operations prior to performing functional operations. In the illustrative example of FIG. 3A, the control logic block, for example via appropriate selection of multiplexers, causes the block cipher logic circuit to first perform (304) BOSR operation; and then perform (306) functional operation after the completion of the BOSR operation 304.

Figure 3B:
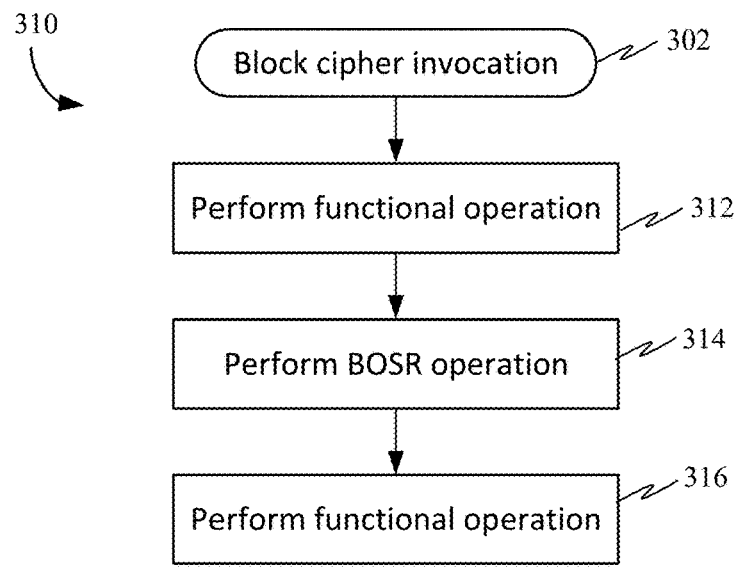

FIG. 3B shows the process flow when BOSR operations are interspersed with functional operations. Similar to FIG. 3A, the method 310 begins with receiving the invocation of a block cipher logic circuit 302 to begin cipher operation. In response to the invocation, the control logic block can control the inputs to the block cipher logic circuit and the outputs from the block cipher logic circuit to perform BOSR operations and functional operation such that the cipher is used for BOSR operations interspersed with performing functional operations. In the illustrative example of FIG. 3B, the control logic block causes, for example via appropriate selection of multiplexers, the block cipher logic circuit to first perform (312) some amount or portion of functional operation; switch to perform (314) BOSR operation; and return to perform (316) a remaining amount or another amount or portion of functional operation. The method of interspersing the performing of BOSR operation between functional operation can continue until directed by control logic block or an external command, such as a reset.

Figure 3C:
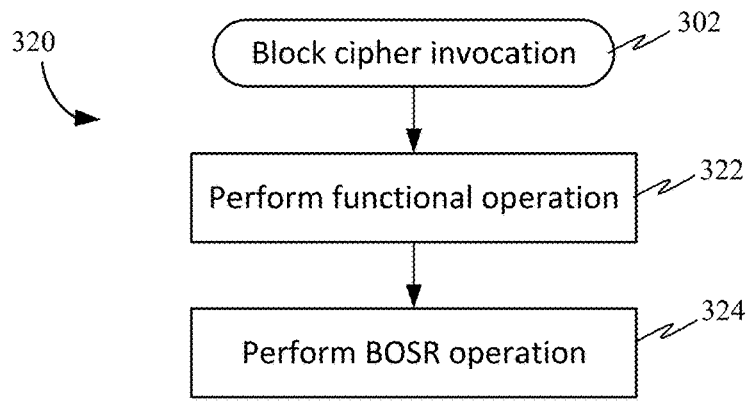

FIG. 3C shows the process flow when BOSR operation is performed after functional operation. Similar to FIGS. 3A and 3B, the method 320 begins with receiving the invocation of a block cipher logic circuit 302 to begin cipher operation. In response to the invocation, the control logic block can control the inputs to the block cipher logic circuit and the outputs from the block cipher logic circuit to perform BOSR operations and functional operations such that the cipher is used for BOSR operations after performing functional operations. In the illustrative example of FIG. 3C, the control logic block causes, for example via appropriate selection of multiplexers, the block cipher logic circuit to first perform (322) the functional operations; and then perform (324) BOSR operation.

Figure 3D:
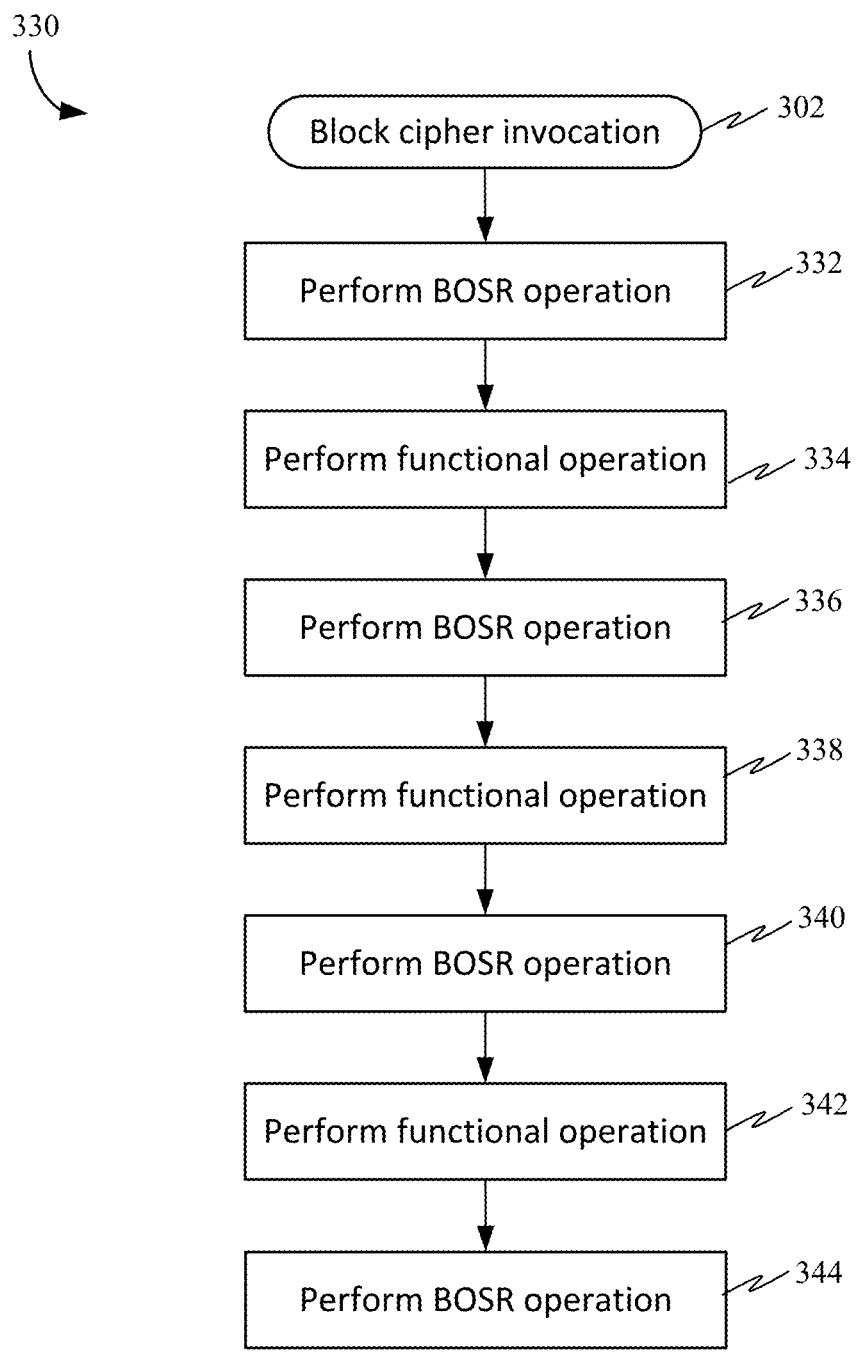

FIG. 3D shows an example implementation of a process flow when BOSR operation is performed as a combination of the implementations in FIGS. 3A-3C. Referring to FIG. 3D, method 330 begins with receiving an invocation of a block cipher logic circuit 302 to begin cipher operation. In response to the invocation, the control logic block can control the inputs to the block cipher logic circuit and the outputs from the block cipher logic circuit to perform BOSR operations and functional operations. In the illustrative example of FIG. 3B, the control logic block causes, for example via appropriate selection of multiplexers, the block cipher logic circuit to perform (332) a BOSR operation; switch to perform (334). functional operation; and similar to that described with respect to FIG. 3B, perform (336) BOSR operation after some amount or portion of functional operation. The block cipher logic circuit can then perform (338) a remaining amount or another amount or portion of functional operation. For example, the cipher system can perform (340) another BOSR operation before switching to perform (342) a remaining amount of functional operation expected in response to the block cipher invocation. A final BOSR operation can be performed (344) upon completing the last portion of the functional operation.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A cipher system comprising:
   a bits-of-some-randomness (BOSR) reservoir;
   a first multiplexer circuit coupled to receive a BOSR key at a first input, a functional key at a second input, and a first control signal for selection between the BOSR key and the functional key;
   a second multiplexer circuit coupled to receive a BOSR state coupled at a first input, a functional state at a second input, and a second control signal for selection between the BOSR state and the functional state;
   a third multiplexer circuit coupled to receive a data input at a first input, a certain number of bits at a second input, and a third control signal for selection between the first input and the certain number of bits and coupled to output to the functional state;
   a block cipher logic circuit coupled to receive a first output from the first multiplexer circuit and a second output from the second multiplexer circuit, the block cipher logic circuit coupled to output the certain number of bits into the BOSR reservoir or as a functional output according to a fourth control signal; and
   a control logic block outputting the first control signal, the second control signal, the third control signal, and the fourth control signal, the control logic block controlling whether a clock cycle of the block cipher logic circuit is used for a BOSR operation or a functional operation.

2. The cipher system of claim 1, wherein the control logic block further outputs a fifth control signal to selectively reseed the BOSR key using the certain number of bits output from the block cipher logic circuit.

3. The cipher system of claim 1, wherein during a BOSR operation, the control logic block, using the first control signal, the second control signal, and the fourth control signal, controls the first multiplexer circuit to output the BOSR key to the block cipher logic circuit, controls the second multiplexer circuit to output the BOSR state to the block cipher logic circuit, and either directs the output of the certain number of bits from the block cipher logic circuit to the BOSR reservoir or directs the output of the certain number of bits from the block cipher logic circuit to be discarded; and
   during a functional operation, the control logic block, using the first control signal, the second control signal, and the fourth control signal, controls the first multiplexer circuit to output the functional key to the block cipher logic circuit, controls the second multiplexer circuit to output the functional state to the block cipher logic circuit, and directs the output of the certain number of bits from the block cipher logic circuit as the functional output.

4. The cipher system of claim 1, wherein the control logic block is coupled to receive output from at least one linear feedback shift register (LFSR).

5. The cipher system of claim 1, wherein the control logic block, using the first control signal, the second control signal, and the fourth control signal, controls a number of clock cycles of the block cipher logic circuit for BOSR operation.

6. The cipher system of claim 5, wherein one or more BOSR operation cycles of the number of clock cycles for BOSR operation are added before invoking the functional operation of the block cipher logic circuit, during invoking the functional operation of the block cipher logic circuit, or after invoking the functional operation of the block cipher logic circuit.

7. The cipher system of claim 5, wherein the number of clock cycles for BOSR operation is an average number of extra clock cycles over a predetermined amount of time or a predetermined number of cycles.

8. The cipher system of claim 5, wherein the BOSR reservoir is coupled to the control logic block, the control logic block receiving a signal indicative of a number of BOSR bits in the BOSR reservoir and determining the number of clock cycles for BOSR operation according to the signal indicative of the number of BOSR bits in the BOSR reservoir.

9. The cipher system of claim 8, wherein the number of clock cycles for BOSR operation is an average number of extra clock cycles over a predetermined amount of time or a predetermined number of cycles.

10. The cipher system of claim 8, further comprising a BOSR reservoir sensor, wherein the BOSR reservoir sensor determines whether the number of BOSR bits in the BOSR reservoir is below a threshold number of bits, and outputs the signal indicative of the number of BOSR bits in the BOSR reservoir when the number of BOSR bits in the BOSR reservoir is below the threshold number of bits.

11. The cipher system of claim 10, wherein the threshold number of bits is based on a desired average rate of production of BOSR bits.

12. The cipher system of claim 1, wherein the BOSR reservoir is implemented in a dynamic random access memory (DRAM).

13. The cipher system of claim 1, wherein the BOSR reservoir is implemented in a static random access memory (SRAM).

14. The cipher system of claim 1, wherein the BOSR reservoir is implemented in a register array comprising latches or flip-flops.

15. A method of continuously replenishing a reservoir of bits-of-some-randomness (BOSR), the method comprising:
   receiving an invocation of a block cipher logic circuit;
   in response to the invocation of the block cipher logic circuit, controlling inputs to the block cipher logic circuit and outputs from the block cipher logic circuit to perform BOSR operations and functional operations, wherein the BOSR operations are performed during a number of extra clock cycles inserted before the functional operations, interspersed between the functional operations, inserted after the functional operations, or a combination thereof, wherein during a BOSR operation, a control logic block controls a first multiplexer circuit to output a BOSR key to the block cipher logic circuit, controls a second multiplexer circuit to output a BOSR state to the block cipher logic circuit, and controls receipt by a BOSR reservoir of an output of a certain number of bits from the block cipher logic circuit; and wherein during a functional operation, the control logic block controls the first multiplexer circuit to output a functional key to the block cipher logic circuit, controls the second multiplexer circuit to output a functional state to the block cipher logic circuit, and directs the output of the certain number of bits from the block cipher logic circuit as a functional output.

16. The method of claim 15, wherein the number of extra clock cycles are an average number of extra clock cycles over a predetermined amount of time or a predetermined number of invocations.

17. The method of claim 15, further comprising:
receiving a signal indicative of a number of BOSR bits in the BOSR reservoir; and
adjusting the number of extra clock cycles according to the signal indicative of the number of BOSR bits in the BOSR reservoir.

18. The method of claim 15, wherein the control logic block controls receipt by the BOSR reservoir of the output of the certain number of bits from the block cipher logic circuit by directing the certain number of bits from the block cipher logic circuit to the BOSR reservoir, the method further comprising, when the certain number of bits are directed from the block cipher logic circuit to the BOSR reservoir, performing an XOR operation with the certain number of bits from the block cipher logic circuit and at least some bits already in the BOSR reservoir.

19. The method of claim 15, wherein the control logic block controls receipt by the BOSR reservoir of the output of the certain number of bits from the block cipher logic circuit by directing the certain number of bits from the block cipher logic circuit to the BOSR reservoir or by discarding the certain number of bits.

20. The method of claim 15, further comprising:
selectively reseeding the BOSR key using the certain number of bits output from the block cipher logic circuit.

* * * * *